US011230879B2

(12) United States Patent
Manhire

(10) Patent No.: US 11,230,879 B2
(45) Date of Patent: Jan. 25, 2022

(54) SERVICEABLE ACTUATION SYSTEM FOR ACTIVE GRILLE SHUTTER

(71) Applicants: Magna Exteriors Inc., Concord (CA); Jeffrey B. Manhire, Rochester, MI (US)

(72) Inventor: Jeffrey B. Manhire, Rochester, MI (US)

(73) Assignee: MAGNA EXTERIORS, INC, Concord (CA)

( * ) Notice: Subject to any disclaimer, the term of this patent is extended or adjusted under 35 U.S.C. 154(b) by 0 days.

(21) Appl. No.: 15/734,853

(22) PCT Filed: Apr. 29, 2019

(86) PCT No.: PCT/US2019/029678
§ 371 (c)(1),
(2) Date: Dec. 3, 2020

(87) PCT Pub. No.: WO2019/236212
PCT Pub. Date: Dec. 12, 2019

(65) Prior Publication Data
US 2021/0230936 A1 Jul. 29, 2021

Related U.S. Application Data

(60) Provisional application No. 62/680,687, filed on Jun. 5, 2018.

(51) Int. Cl.
*E06B 9/02* (2006.01)
(52) U.S. Cl.
CPC ..................... *E06B 9/02* (2013.01)

(58) Field of Classification Search
CPC .......... E06B 9/02; B60K 11/08; B60K 11/085
See application file for complete search history.

(56) References Cited

U.S. PATENT DOCUMENTS 9,447,719 B2 * 9/2016 Kiener ..................... F28F 27/02
10,274,027 B2 * 4/2019 Matthews ............. H02K 7/1166
(Continued)

FOREIGN PATENT DOCUMENTS

| EP | 3199395 A1 | 2/2017 | |
| EP | 3199395 A1 * | 8/2017 | ........... B60K 11/085 |

(Continued)

OTHER PUBLICATIONS

Notification of Transmittal of the International Search Report and the Written Opinion of the International Searching Authority for International Application No. PCT/US2019/029678, dated Sep. 20, 2019.

*Primary Examiner* — Marcus Menezes
(74) *Attorney, Agent, or Firm* — Warn Partners, P.C.

(57) ABSTRACT

A serviceable actuation arrangement for an active grille shutter system. The serviceable actuation arrangement includes a linkage connected to all of the vanes of the active grille shutter system. The linkage is connected to an actuator and moves vertically to rotate the vanes between an open position and a closed position. Between the actuator and the linkage are drive arms that are removably connected to the actuator. There is a connector clip that connects the drive arms and the linkage together in a removable manner. The connector clip retains the components together during operation, but provides a quick release so that the actuator can be removed and changed without having to disassemble the vanes from the linkage.

12 Claims, 10 Drawing Sheets

(56) References Cited

U.S. PATENT DOCUMENTS

| | | | | |
|---|---|---|---|---|
| 11,021,195 B2* | 6/2021 | Zielinski | ............... | B62D 37/02 |
| 2010/0243352 A1* | 9/2010 | Watanabe | ............ | B60K 11/085 |
| | | | | 180/68.1 |
| 2013/0284401 A1* | 10/2013 | Kiener | ................ | B60K 11/085 |
| | | | | 165/98 |
| 2014/0094104 A1* | 4/2014 | Manhire | ............ | B60K 11/085 |
| | | | | 454/152 |
| 2016/0089971 A1* | 3/2016 | Asai | .................... | B60K 11/085 |
| | | | | 296/193.1 |
| 2017/0341505 A1* | 11/2017 | Knauer | ............... | B60K 11/085 |
| 2019/0184813 A1* | 6/2019 | Lindberg | .............. | B29C 45/006 |
| 2020/0346538 A1* | 11/2020 | Lindberg | ................ | F24F 13/15 |
| 2020/0391418 A1* | 12/2020 | Lindberg | .......... | B29C 45/14336 |
| 2020/0391685 A1* | 12/2020 | Manhire | ................ | B60R 19/52 |

FOREIGN PATENT DOCUMENTS

| | | | | |
|---|---|---|---|---|
| FR | 3058367 A1 | 5/2018 | | |
| FR | 3078505 A1 * | 9/2019 | ........... | B60K 11/085 |
| GB | 2082520 A | 3/1982 | | |
| KR | 20120050106 A * | 5/2012 | ........... | B60K 11/085 |
| KR | 20120113956 A | 10/2012 | | |
| WO | 2016087567 A1 | 6/2016 | | |
| WO | 2018087448 A1 | 5/2018 | | |
| WO | WO-2019236212 A1 * | 12/2019 | ................ | F01P 7/10 |

\* cited by examiner

SERVICEABLE ACTUATION SYSTEM FOR ACTIVE GRILLE SHUTTER

CROSS-REFERENCE TO RELATED APPLICATIONS

This application is a National Stage Utility Application under 35 USC 371 claiming priority to PCT International Application PCT/US19/29678, filed Apr. 29, 2019, which claims priority to U.S. Provisional Patent Application No. 62/680,687 filed on Jun. 5, 2018. The disclosures are incorporated herein by reference.

FIELD OF THE INVENTION

The present invention relates to an improved grille shutter linkage, to allow servicing the actuator without dismantling the full active grille shutter assembly.

BACKGROUND OF THE INVENTION

Current active grille shutter systems use an actuator which is directly connected to the vane linkage and integrated into the frame in such a way that it is very difficult to service the actuator if repair is needed. There is a need to design an improved grille shutter linkage to allow servicing the actuator without dismantling the full active grille shutter assembly.

This invention changes the way the linkage works, from a direct-driven vane, or vanes, to an indirectly-driven linkage, which allows the actuator to de-couple from the vanes by means of a simple clip assembly.

SUMMARY OF THE INVENTION

The present invention relates to a serviceable actuation arrangement for an active grille shutter system. The arrangement includes a linkage having two vertical link arms spaced apart by a bridge. Each of the two vertical link arms has a plurality of vane connection posts. Connected to the bridge is an actuator that has a first drive arm with a pivot aperture position between the actuator and the bridge. There is also a second drive arm with a pivot aperture position between the actuator in the bridge. Both the first drive arm and the second drive arm have a shaped male connector that is configured to slide into and mate with a shaped female connector on the actuator. This allows the motor of the actuator to rotatably drive the shaped female actuator, which in turn moves the shaped male connectors to cause the first drive arm and second drive arm to rotate.

In order to secure the actuator to the linkage there is provided a connector clip. The connector clip includes a first pivot post that extends through the bridge and the pivot aperture of the first drive arm and a second pivot post extending through the bridge and the pivot aperture of the second drive arm. The connector clip when attached allows the first drive arm and second drive arm to move the linkage through the connection at the bridge, which is secured by the connector clip. If removing the actuator is needed the connector clip allows for the fast disconnection of the actuator by removing the first pivot post and the second pivot post from their respective pivot apertures of the first drive arm and second drive arm. This then allows the actuator to be removed from the arrangement and serviced, without having to disassembly the vanes from the linkage.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
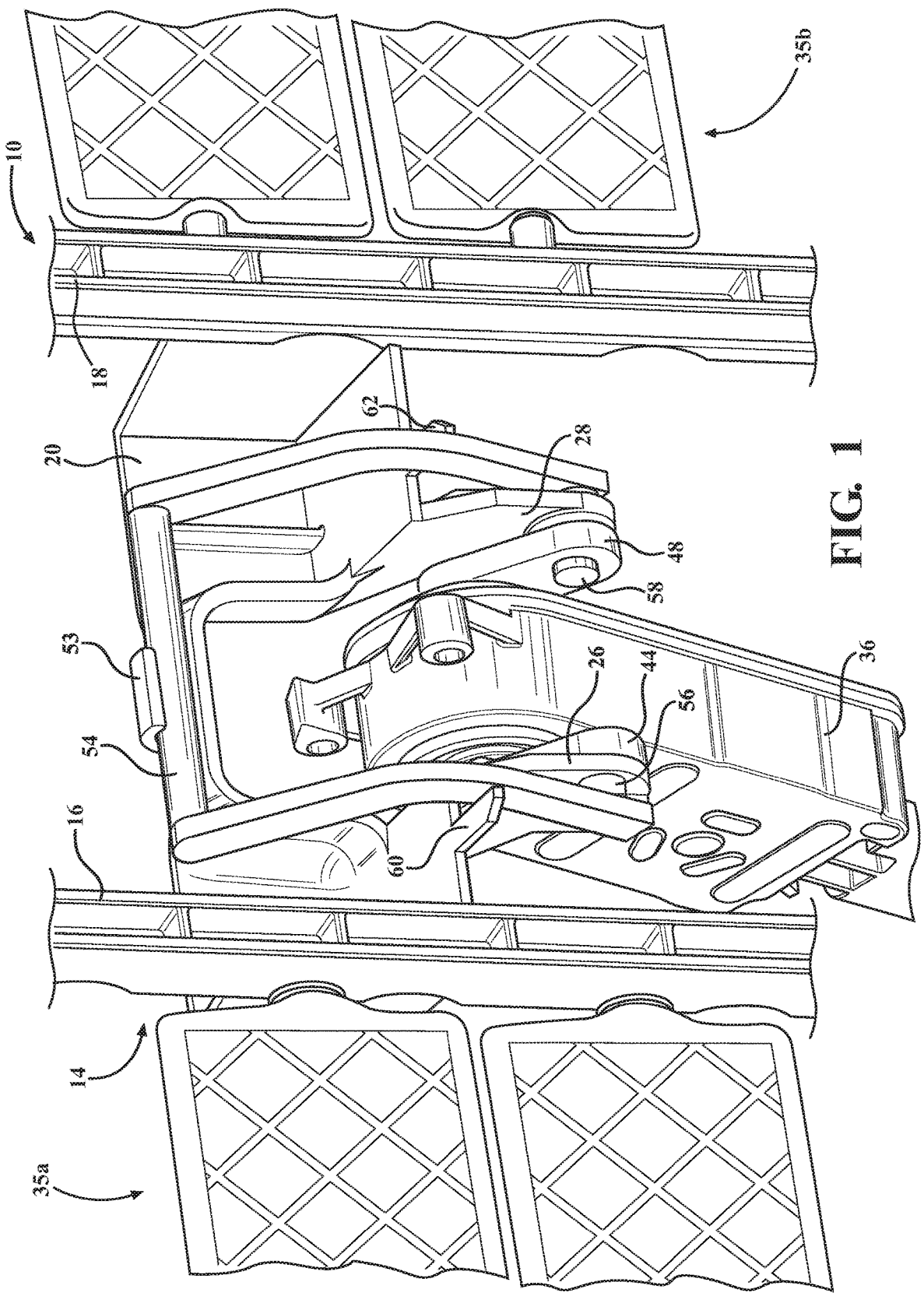
FIG. 1 is an enlarged partial rear view of a serviceable actuator arrangement according to a first embodiment of the present invention.

Referring to FIGS. 1-4, the present invention is directed to a serviceable actuation arrangement 10 for an active grille shutter system 12. The serviceable actuation arrangement 10 includes a linkage with 14 having vertical link arms 16, 18 spaced apart by a bridge 20. The bridge 20 has a clearance opening 22 defined by a curved surface 24 of the bridge 20. The clearance opening 22 includes a first fixed arm 26 defining a first side of the clearance opening 22 and a second fixed arm 28 defining a second side of the clearance opening 22. The first fixed arm 26 and the second fixed arm 28 each have an aperture 30, 32.

The two vertical link arms 16, 18 of the linkage 14 include a plurality of vane connection posts 34, 34' that connect to apertures 33, 33' on vanes 35a, 35, which are shown as two banks of vanes with a left bank of vanes 35a and a right bank of vales 35b. The vane connection posts 34, 34' can be round protrusions or any type of protrusion capable of sliding into and connecting to a vane member in a manner that allows rotation of the vanes 35 about the plurality connection posts 34, 34'. Also depending on the application apertures are formed on the two vertical link arms and posts are formed on the vanes that connect to the apertures on the vertical link arms. The serviceable actuation arrangement 10 also includes an actuator 36 positioned between the first fixed arm 26 and the second fixed arm 28, within the clearance opening 22. The actuator 36 includes a first drive connection 38 and a second drive connection 40, which are apertures through a housing 42 of the actuator 36 that provide access to a rotational force transmitting element. An example is a rotational force element is a hexagonal rotating gear coupled to a motor and located within the first drive connection 38 and the second drive connection 40.

The serviceable actuation arrangement 10 also includes a first drive arm 44 position between the actuator 36 and the first fixed arm 26. The first drive arm 44 is rotatably connected to the first drive connection 38 and the first drive arm 44 also has a pivot aperture 46 that aligns with the aperture 30 of the first fixed arm 26. There is also a second drive arm 48 positioned between the actuator 36 and the second fixed arm 28. The second drive arm 48 is rotatably connected to the second drive connection 40 of the actuator 36. The second drive arm 48 also has a pivot aperture 50 that aligns with the aperture 32 of the second fixed arm 28.

The serviceable actuation arrangement 10 further includes a clip 52 having a pivot rod 54 connected to the bridge 20 of the linkage 14. The connection between the clip 52 and bridge 20 of the linkage 14 is a snap fit connection 53 that allows for rotation of the pivot rod 54 of the clip 52 with respect to the bridge 20. The clip 52 includes two parallel arced bows that include a first parallel arced bow 64 and a second parallel arced bow 66, that both extend in parallel to each other from opposing ends of the pivot rod 54. A first pivot post 56 extends from the end of the first parallel arced bow 64 toward the second parallel arced bow 66. The first pivot post 56 pivotally extends through both the aperture 30 of the first fixed arm 26 and the pivot aperture 46 of the first drive arm 44. There is also a second pivot post 58 that extends from the second parallel arced bow 66. The second pivot post 58 is pivotally extending through both the aperture 32 of the second fixed arm 28 and the pivot aperture 50 of the second drive arm 48 toward the first parallel arced bow 64.

According to the present invention the vanes 35a, 35b are all driven by the linkage 14, which is not connected, directly to the actuator 36. The linkage 14 is connected to the actuator 36 via connector clip 52, the first drive arm 44 and the second drive arm 48, which can be disassembled to allow the actuator 36 to be removed without having to disassemble or disconnector vanes from the linkage 14.

Figure 2:
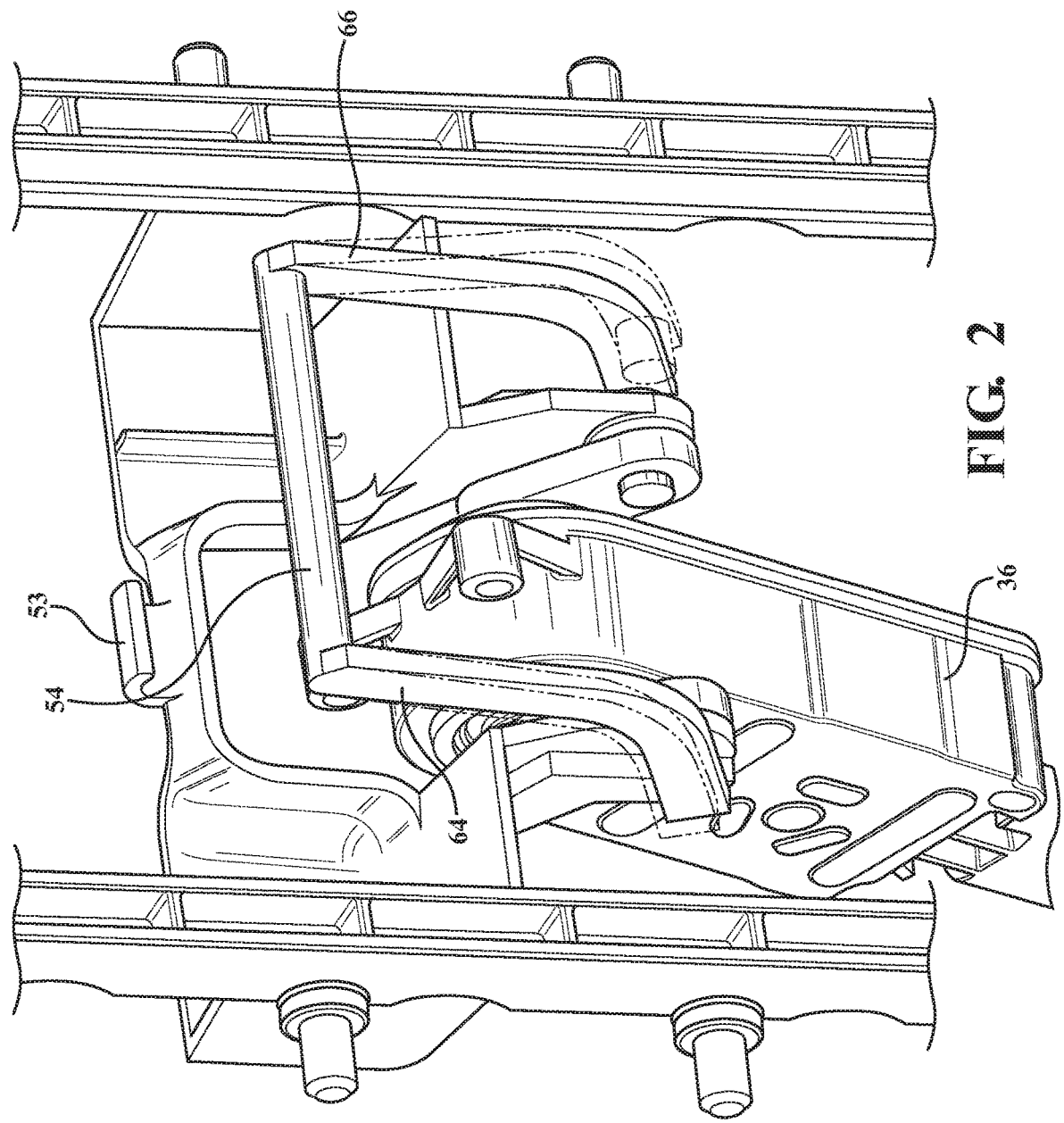
FIG. 2 is an enlarged partial rear view of a serviceable actuator arrangement according to the first embodiment of the present invention with the clip member partially released.
Figure 3:
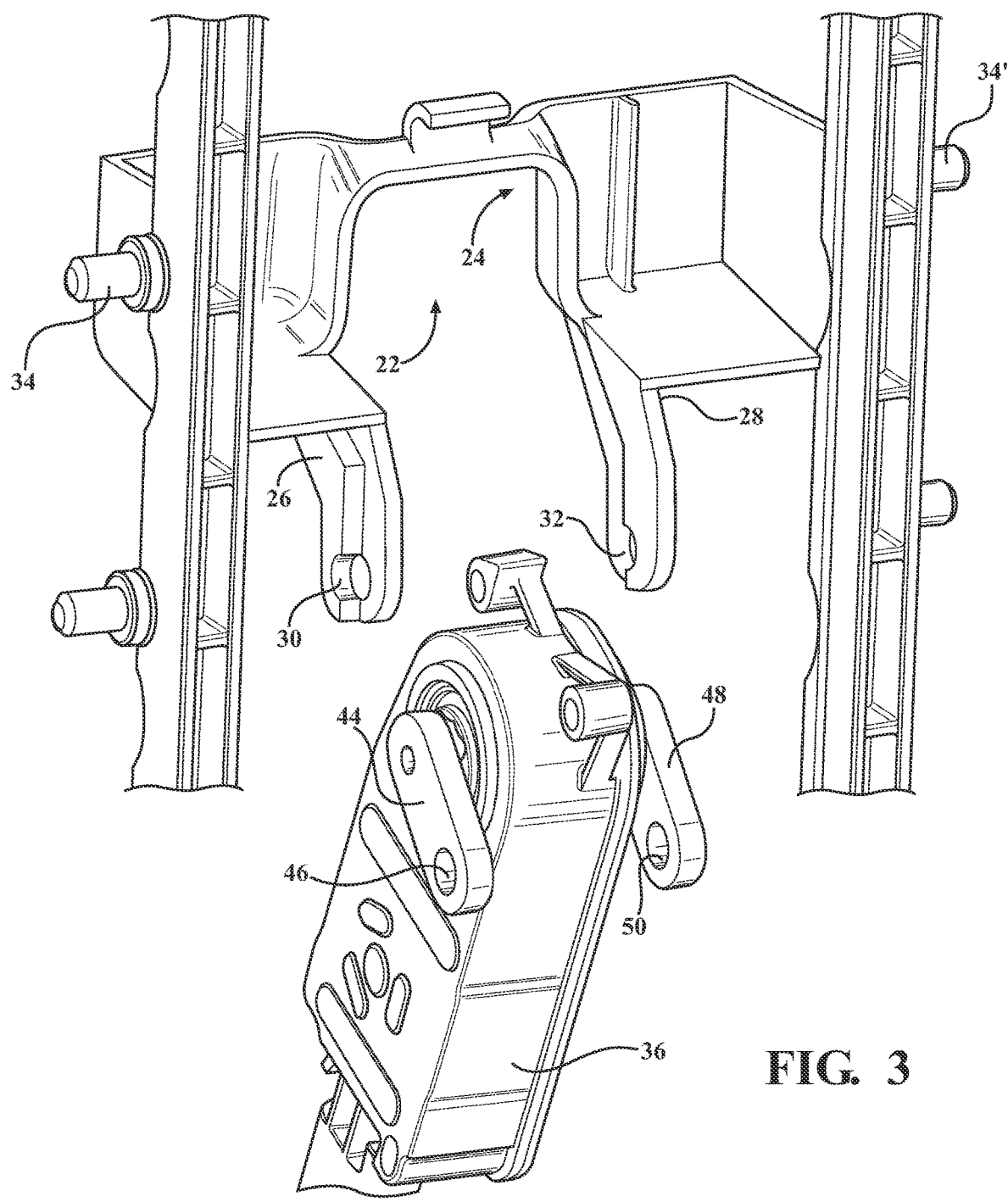
FIG. 3 is an enlarged partial rear view of a serviceable actuator arrangement with the clip member removed and the actuator disconnected according to the first embodiment of the present invention.
Figure 4:
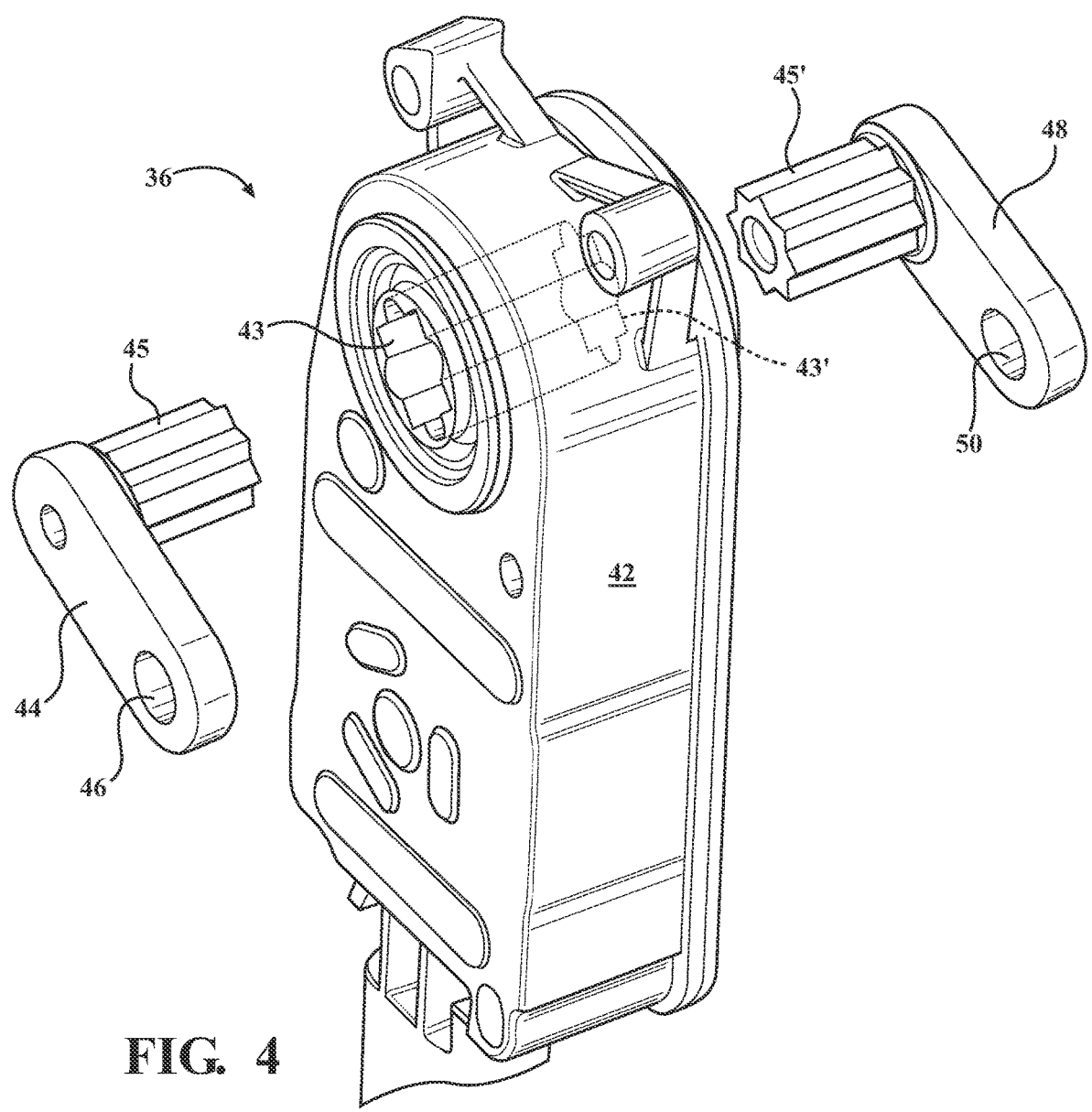
FIG. 4 is an exploded view of the actuator and drive arms according to the first embodiment of the present invention.
Figure 5:
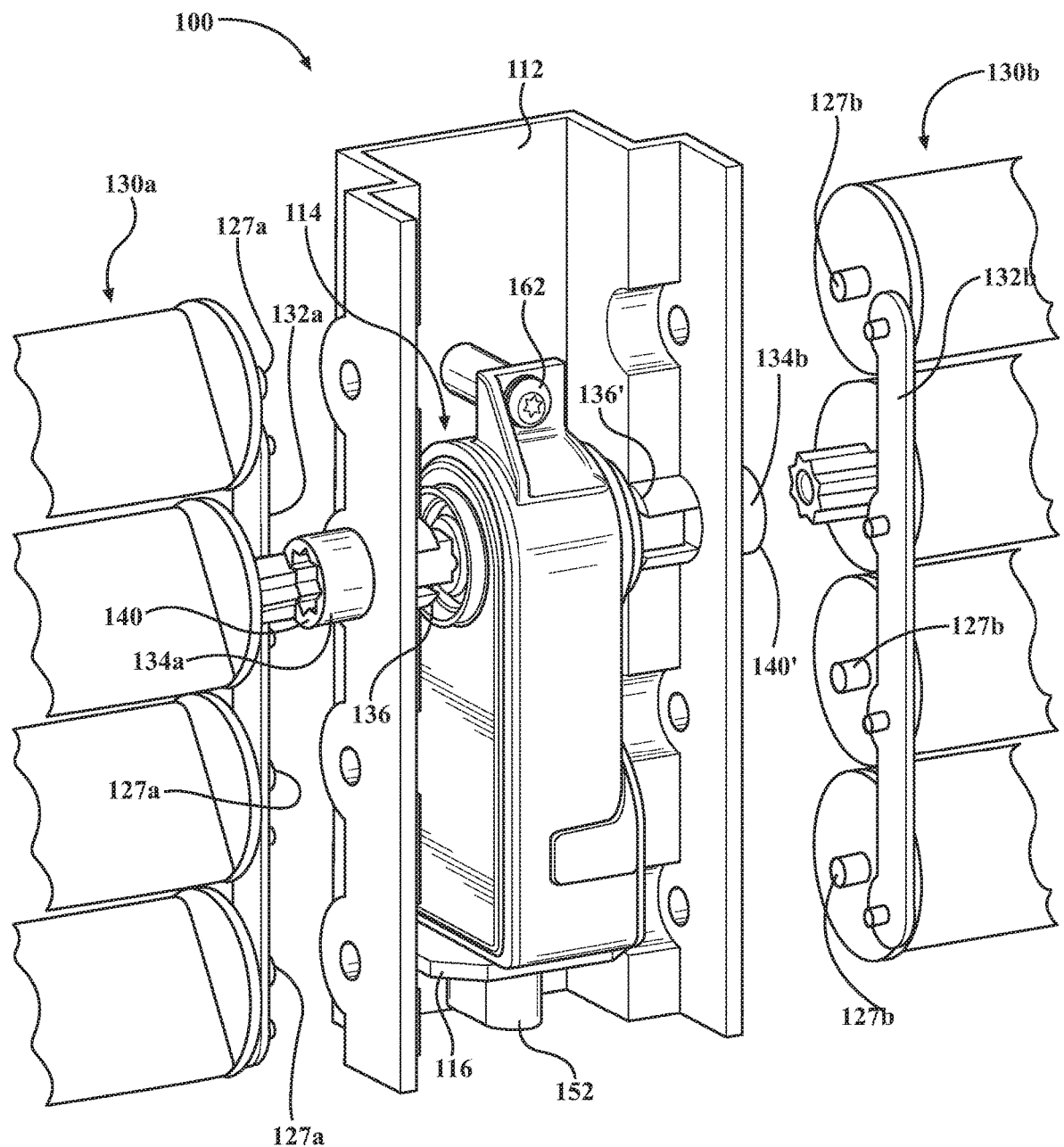
FIG. 5 is an enlarged partial rear view of a serviceable actuator arrangement according to a second embodiment of the present invention.
Figure 6:
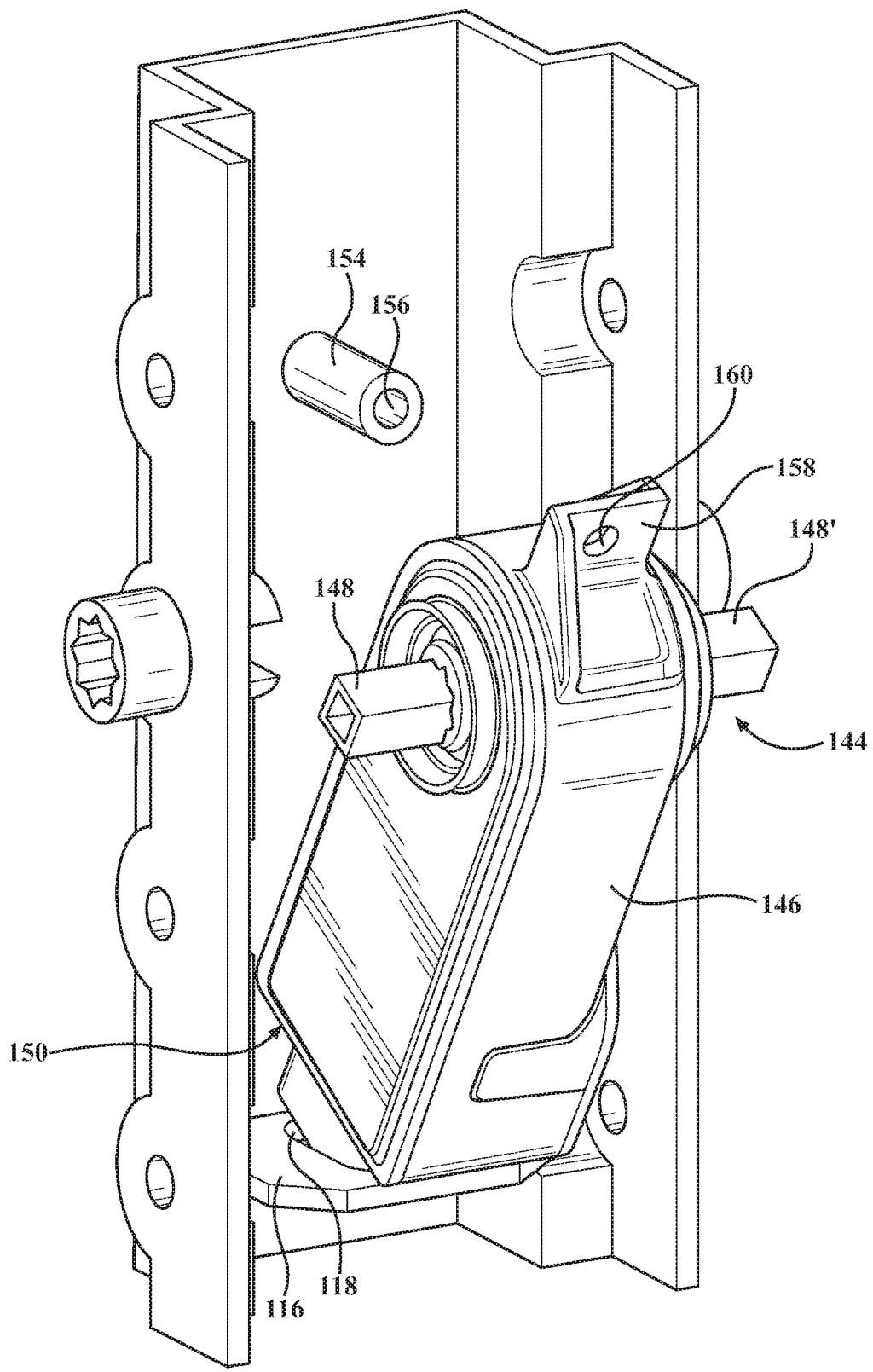
FIG. 6 is an enlarged partial rear view of a serviceable actuator arrangement with the fastener removed and the actuator being in the process of being removed according to the second embodiment of the present invention.
Figure 7:
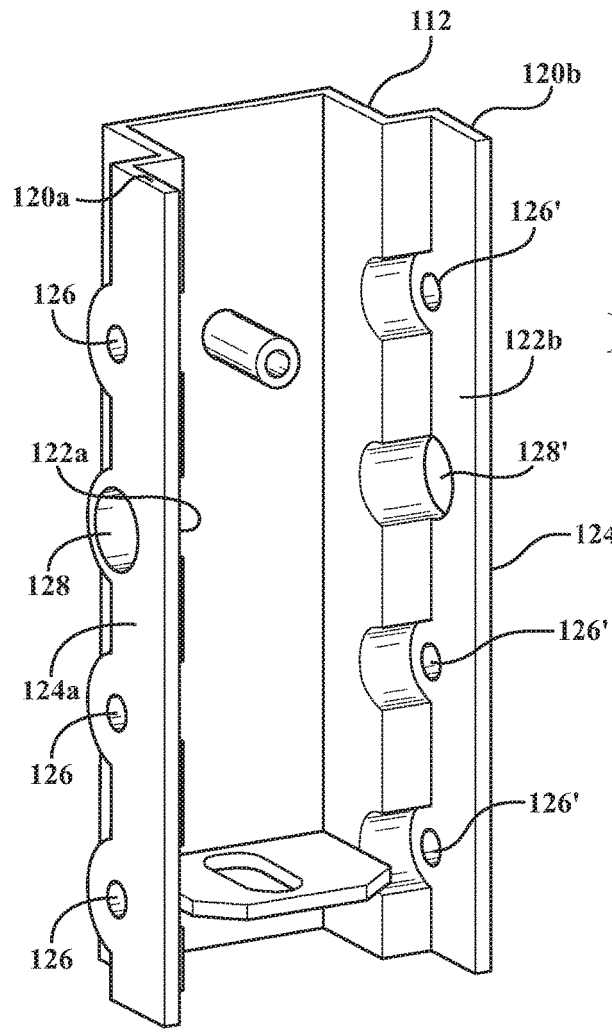
FIG. 7 is an enlarged view of the frame portion of the actuator arrangement with the actuator removed according to an embodiment of the present invention.
Figure 8:
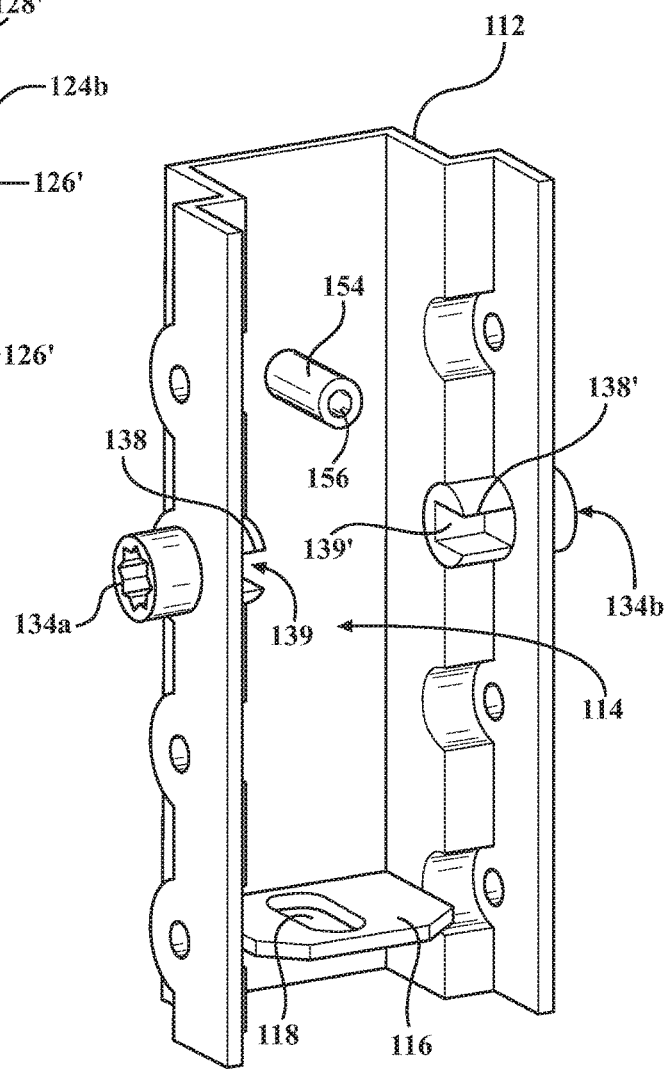
FIG. 8 is an enlarged view of the frame portion and drive elements of the actuator arrangement with the actuator removed according to an embodiment of the present invention.

FIGS. 1-4 depict how the actuator 36 is removed. In FIG. 1 the actuator 36 is connected to the linkage 14 and held in place by the clip 52 which prevented from rotating by the pivot rod 54 being held in place by a snap fit connection 53 formed on the bridge 20. Also shown are retainer fingers 60, 62 that extend from the first fixed arm 26 and second fixed arm 28 and also assist in securing the clip 52 by pressing the two parallel arced bows 64, 66 inward. The retainer fingers 60, 62 are an optional features and are not necessary for all embodiments of the invention. In FIG. 2 the pivot rod 54 has been released from the snap fit connection 52 and the two parallel arced bows 64, 66 have been released from the retainer fingers 60, 62; allowing the clip 52 to rotate downward relative to FIG. 2. When the clip 52 has been released, the parallel arced bows 64, 66 can be flexed outward from each other to pull the first pivot post 56 and second pivot post 58 out of the apertures 30, 32 of the first fixed arm 26 and second fixed arm 28, as well as the respective pivot apertures 46, 50 of the respective first drive arm 44 and second drive arm 48. FIG. 3 shows the actuator 36 being removed from the linkage 14 once that clip 52 has been removed. The linkage 14 clears the actuator 36, so the actuator 36 may be removed without dis-assembly of any other components within the active grille shutter system 12. The actuator 36 can be further disassembled as shown in FIG. 4. The shaped male connector 45 of first drive arm 44 slides out of the shaped female connector of the actuator 36. Likewise the shaped male connector 45' of the second drive arm 48 slides out of the shaped female connector 43' of the actuator 36.

Figure 9:
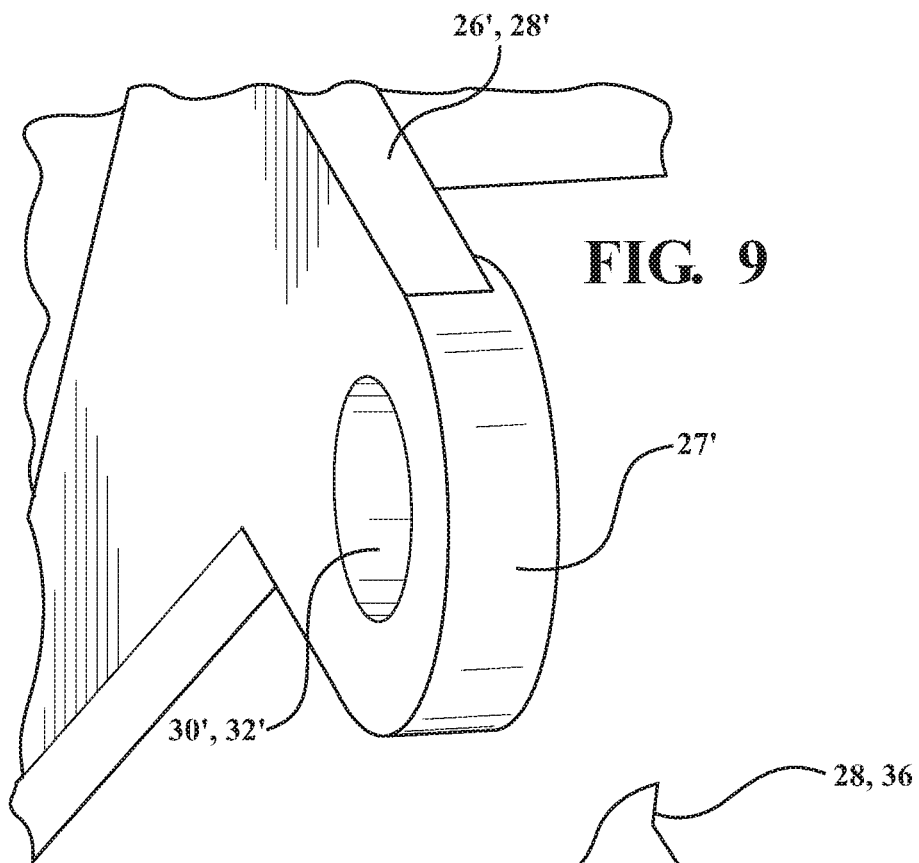
FIG. 9 is an enlarged view of a low profile aperture variation of the first or second fixed arm according to the first embodiment of the invention.
Figure 10:
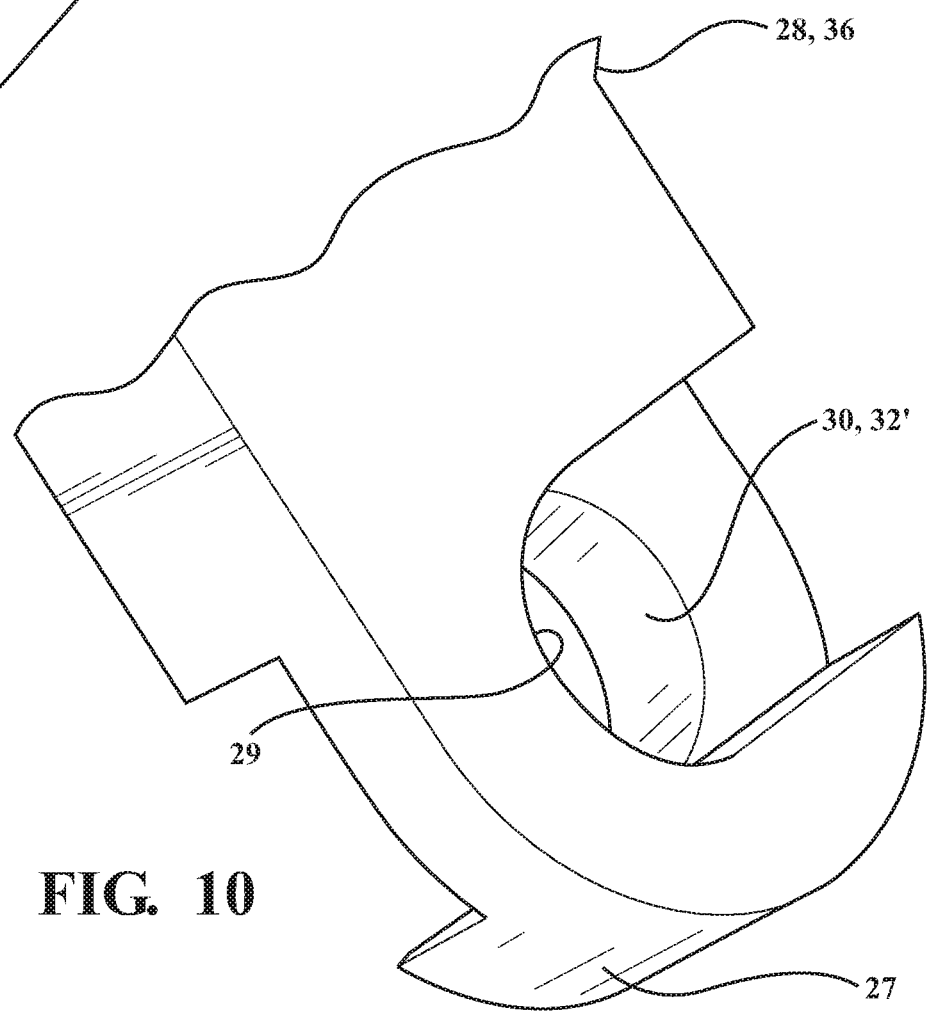
FIG. 10 is an enlarged view of a double U shaped curved aperture variation of the first or second fixed arm according to the first embodiment of the invention.

Referring now to FIGS. 9 and 10 two additional variations of the first fixed arm or second fixed arm 28 are shown. FIG. 9 depicts a first fixed arm 26' or second fixed arm 28' having a thickness 27' around an aperture 30', 32' that is lower in profile or thinner when compared to a thickness 27 of the variation shown in FIG. 10. The lower profile provides clearance and packaging advantages for the area of the fixed arms 26', 28'. However, the lower profile presents a manufacturing disadvantage that requires the mold tooling used to form the linkage 14 have action features needed to expel the linkage 14 from the mold. The variation shown in FIG. 10. Depicts a fixed arm 26 or second fixed arm 28 having two opposing U shaped curves 29, 31 that are allow for the formed link 14 to be removed from the tooling without the need for action in the tooling.

Referring now to FIGS. 5-8 an alternate embodiment of a serviceable actuation arrangement 100 is shown. The serviceable actuation arrangement includes a frame portion 112 of an active grille shutter system. The frame portion 112 is depicted as being a center bar of an active grille shutter system, however, it is within the scope of the invention for the frame portion 112 to be a different portion of the frame such as a side bar, top bar, bottom bar or virtually another portion of the frame of the active grille shutter system. The frame portion 112 includes an actuator seating section 114 with a base 116 having an aperture 118 through the base 116. There are also two opposing side walls 120a, 120b that each have an inside surface 122a, 122b facing the inward to create walls of the actuator seating section 114. The opposing side walls 120a, 120b also have outside surfaces 124a, 124b. The opposing side walls 120a, 120b have a plurality of vane apertures 126, 126' that extend through from the respective inside surface 122a, 122b to the outside surface 124a, 124b. The vane apertures 126, 126' are configured to receive respective post 127a, 127b located on one of a plurality of driven vanes 130a, 130b. As shown there are six driven vanes 130a, 130b, which are shown as a left side bank of vanes and a right side bank of vanes, with the terms left and right being in relation to the frame portion 112 shown in FIG. 5. While six driven vanes are shown it is within the scope of this invention for a greater or lesser number of driven vanes to be present depending on the needs of a particular application. Each bank of vanes also includes a drive vane 131a, 131b that is driven by an actuator 144 through various connections that will be discussed in greater detail below. Each left bank and right bank includes a link bar 132a, 132b that is connected to the respective drive vane 131a, 131b and driven vanes 130a, 130b. The link bar 132a, 132b serves to transfer rotational force from the respective drive vanes 131a, 131b to the driven vanes 130a, 130b.

The opposing side walls 120a, 120b each have a drive aperture 128, 128' with a drive element 134a, 134b rotatably extending through the drive aperture 128, 128'. In the present embodiment of the invention the drive element 134, 134' is formed through the drive aperture 128, 128' in the same mold using a two shot molding process, thereby eliminating the need for an additional assembly step. Each drive element 134a, 134b has a first end 136, 136' located within the actuator seating section 114 and a second end 140, 140' of the drive element 134a, 134b is located outside of the frame portion 112.

The actuator 144 has a housing 146 with drive shafts 148, 148' extending from the housing 146. Each of the drive shafts 148, 148' is configured to be driven bi-directionally and are powered by a motor (not shown) located within the housing 146. The first end 136, 136' of the drive element has a slot 139, 139' having an open edge 138, 138' which allows for the respective drive shafts 148, 148' to slide into the slot 139, 139' through the open edge 138, 138' so that the drive element 134a, 134b is driven bi-directionally with the actuator 144.

The actuator 144 housing 146 also includes a seat surface 150 configured to contact against the base 116. A connector 152 extends from the seat surface 150 of the actuator housing 146 and provides a port for powering and controlling the movement of the motor of the actuator 144. The connector 152 extends through the aperture 118 of the base 116 when the actuator 144 is placed in the actuator seating section 114.

In order to align the drive shafts 148, 148' with the drive element 134a, 134b, there is provided a locator post 154 located above the base 116. The locator post has an aperture 156 that is threaded to receive a fastener 162 that holds the actuator 144 in place. The fastener 162 is positioned through an aperture 160 formed on a flange 158 extending from the top surface of the housing 146. While a fastener and threaded connections are shown it is within the scope of this invention for the locator post 154 and flange 158 to have a snap tab or mechanical clip connection.

Figure 11:
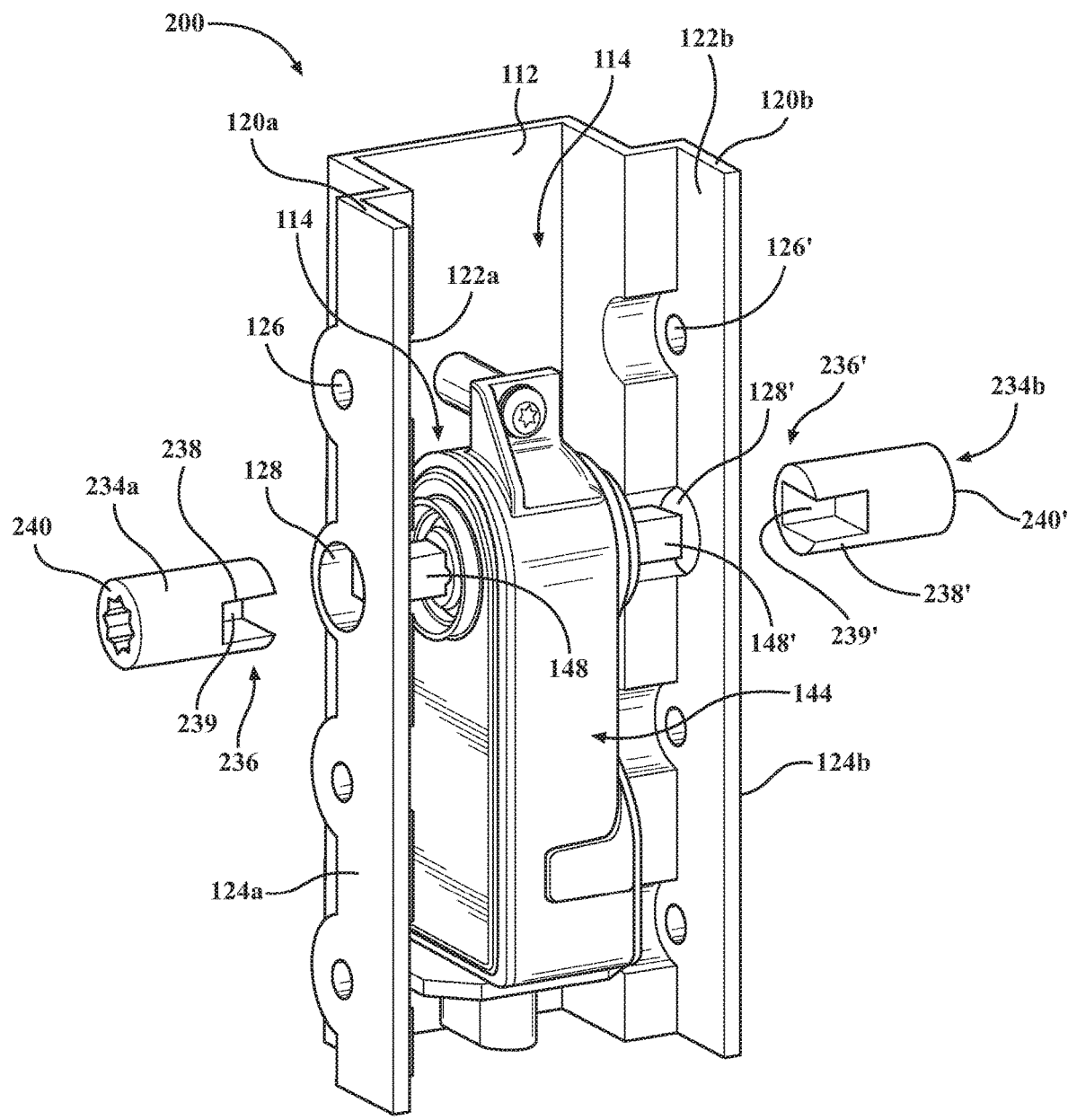
FIG. 11 is another alternate embodiment a serviceable actuation arrangement.

Referring now to FIG. 11 is another alternate embodiment a serviceable actuation arrangement 200 is shown with separate drive elements. The embodiment shown in FIG. 11 has similar structures to those shown in FIGS. 5-8, therefore the same reference numbers will be used, while different or new structures will be labelled with new reference numbers. The serviceable actuation arrangement 200 includes the frame portion 112 of an active grille shutter system. Two opposing side walls 120a, 120b that each have an inside surface 122a, 122b facing the inward to create walls of the actuator seating section 114. The opposing side walls 120a, 120b also have outside surfaces 124a, 124b. The opposing side walls 120a, 120b have a plurality of vane apertures 126, 126' that extend through from the respective inside surface 122a, 122b to the outside surface 124a, 124b and serve as mounting holes for the driven vanes, just as described above with respect to FIGS. 5-8.

The opposing side walls 120a, 120b each have a drive aperture 128, 128' configured to receive a drive element 234a, 234b rotatably extending through the drive aperture 128, 128'. The drive element 234a, 234b in FIG. 11 differs from the drive element 134a, 134b in FIG. 8 it is a separate piece that is pushed into place through each respective drive aperture 128, 128' rather than being formed in the same mold as the frame portion 112 using a two shot molding process. This embodiment also allows the actuator 144 to be connected to the actuator seating section 114 prior to connection of the drive element 234a, 234b. When the drive element 234a, 234b is positioned through the respective drive aperture 128, 128' a first end 236, 236' will be located within the actuator seating section 114 and a second end 140, 140' of the drive element 134a, 134b is located outside of the frame portion 112.

The actuator 144 drive shafts 148, 148' are configured to connect with the first end 236, 236' of the drive element 234a, 234b. Near the first end 236, 236' is a slot 239, 239' having an open edge 238, 238' which allows for the respective drive shafts 148, 148' to slide into the slot 239, 239' through the open edge 238, 238' so that the drive element 234a, 234b is driven bi-directionally with the actuator 144.

Figure 12:
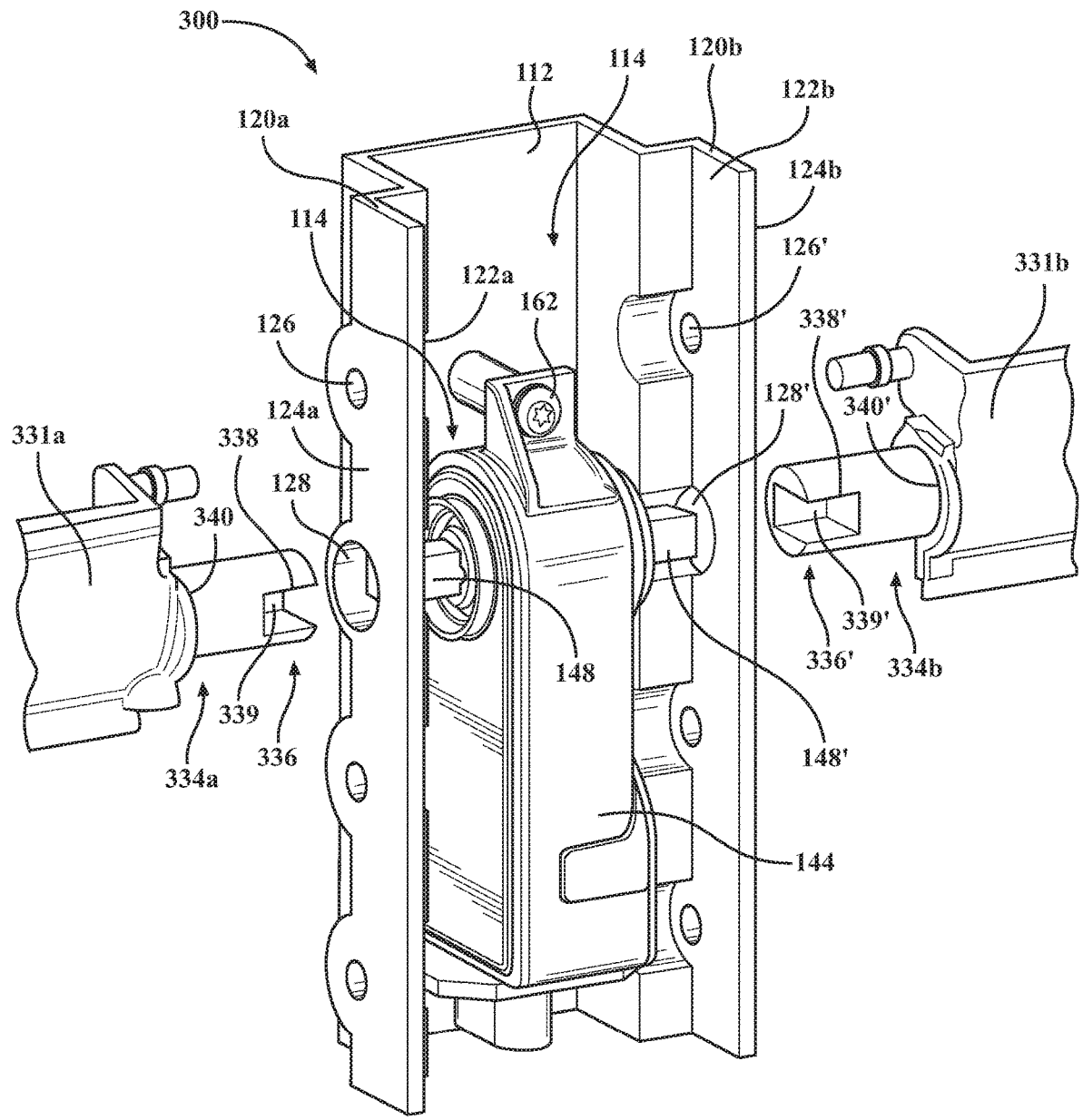
FIG. 12 is another alternate embodiment a serviceable actuation arrangement.

FIG. 12 is an alternate embodiment of a serviceable actuation arrangement 300 having similar structures to those shown in FIGS. 5-8 and 11, therefore the same reference numbers will be used, while different or new structures will be labelled with new reference numbers. The serviceable actuation arrangement 300 includes the frame portion 112 of an active grille shutter system. Two opposing side walls 120a, 120b that each have an inside surface 122a, 122b facing the inward to create walls of the actuator seating section 114. The opposing side walls 120a, 120b also have outside surfaces 124a, 124b. The opposing side walls 120a, 120b have a plurality of vane apertures 126, 126' that extend through from the respective inside surface 122a, 122b to the outside surface 124a, 124b and serve as mounting holes for the driven vanes, just as described above with respect to FIGS. 5-8.

The opposing side walls 120a, 120b each have a drive aperture 128, 128' configured to receive a drive element 334a, 334b rotatably extending through the drive aperture 128, 128'. The drive element 334a, 334b in FIG. 12 differs from the drive element 234a, 234b in FIG. 11 in that they are integrated with a drive vane 331a, 331b rather than being a separate piece. The integration of the drive vane 331a, 331b is accomplished in many ways such as injection molding, welding or using adhesives. When the drive element 334a, 334b is positioned through the respective drive aperture 128, 128' a first end 336, 336' will be located within the actuator seating section 114 and a second end 340, 340' of the drive element 334a, 334b is located outside of the frame portion 112.

The actuator 144 drive shafts 148, 148' are configured to connect with the first end 336, 336' of the drive element 334a, 334b. Near the first end 336, 336' is a slot 339, 339' having an open edge 338, 338' which allows for the respective drive shafts 148, 148' to slide into the slot 339, 339' through the open edge 338, 338' so that the drive element 334a, 334b is driven bi-directionally with the actuator 144.

Those skilled in the art can now appreciate from the foregoing description that the broad teachings of the present invention can be implemented in a variety of forms. Therefore, while this invention has been described in connection with particular examples thereof, the true scope of the invention should not be so limited, since other modifications will become apparent to the skilled practitioner upon a study of the drawings, specification and following claims.

What is claimed is:

1. A serviceable actuation arrangement for an active grille shutter system comprising:
   a linkage having two vertical link arms spaced apart by a bridge;
   an actuator connected to the bridge, wherein the actuator moves the linkage between a first position and a second position;
   a first drive arm with a pivot aperture positioned between the actuator and the bridge;
   a second drive arm with a pivot aperture positioned between the actuator and the bridge; and
   a connector clip having a first pivot post and extending through the bridge and the pivot aperture of the first drive arm and a second pivot post extending through the bridge and the pivot aperture of the second drive arm, wherein the connector clip has two parallel arced bows connected together at one end by a pivot rod, wherein the pivot rod is rotatably connected to the bridge using a snap-fit tab formed on the bridge and the first pivot post extends from a first one of the two bows and the second pivot post extends from a second one of the two bows, such that the connector clip is rotatable about the first pivot post and second pivot post when the pivot rod is disconnected from the snap-fit tab of the bridge.

2. The serviceable actuation arrangement of claim 1 further comprising a clearance opening of the bridge that prevents the bridge from contacting the actuator when the linkage moves.

3. A serviceable actuation arrangement for an active grille shutter system comprising:
   a linkage having two vertical link arms spaced apart by a bridge;
   an actuator connected to the bridge, wherein the actuator moves the linkage between a first position and a second position;
   a first drive arm with a pivot aperture positioned between the actuator and the bridge;
   a second drive arm with a pivot aperture positioned between the actuator and the bridge;
   a connector clip having a first pivot post and extending through the bridge and the pivot aperture of the first drive arm and a second pivot post extending through the bridge and the pivot aperture of the second drive arm; and
   a first fixed arm on the bridge extending toward the actuator and a second fixed arm on the bridge extending toward the actuator, wherein the first fixed arm has an aperture and the second fixed arm has an aperture and the first pivot post of the connector clip extends through both the aperture of the first fixed arm and the pivot aperture of the first drive arm and the second pivot post of the connector clip extends through both the aperture of the second fixed arm and the pivot aperture of the second drive arm.

4. The serviceable actuation arrangement of claim 3 further comprising;
   a first half u-shaped flange on a first side of the first fixed arm and a second half u-shaped flange on a second side of the first fixed arm to assist in the forming of the aperture of the first fixed arm, thereby eliminating the need for extra tooling;
   a first half u-shaped flange on a first side of the second fixed arm and a second half u-shaped flange on a second side of the second fixed arm to assist in the forming of the aperture of the second fixed arm, thereby eliminating the need for extra tooling.

5. The serviceable actuation arrangement of claim 3 further comprising a retainer finger extending from the first fixed arm and the second fixed arm for aligning and retaining the first pivot post and second pivot post through the respective aperture of the first fixed arm and aperture of the second fixed arm.

6. The serviceable actuation arrangement of claim 1 further comprising:
   a plurality of vane pivot posts formed on the two vertical link arms;
   a plurality of vanes of an active grille shutter system, wherein each one of the plurality of vanes is connected to a respective one of the plurality of vane pivot posts.

7. A serviceable actuation arrangement for an active grille shutter system comprising:
   a linkage having two vertical link arms spaced apart by a bridge a first fixed arm and a second fixed arm, wherein the first fixed arm and the second fixed arm each have an aperture;
   a plurality of vane connection posts located on each of the two vertical link arms;
   an actuator positioned between the first fixed arm and the second fixed arm, the actuator includes a first drive connection and a second drive connection;
   a first drive arm positioned between the actuator and the first fixed arm, wherein the first drive arm is rotatably connected to the first drive connection and the first drive arm has a pivot aperture that aligns with the aperture of the first fixed arm;
   a second drive arm positioned between the actuator and the second fixed arm, wherein the second drive arm is rotatably connected to the second drive connection and the second drive arm has a pivot aperture that aligns with the aperture of the second fixed arm; and
   a connector clip having a pivot rod pivotally connected to the bridge of the linkage and having a first pivot post pivotally extending through both the aperture of the first fixed arm and the pivot aperture of the first drive arm and a second pivot post pivotally extending through both the aperture of the second fixed arm and the pivot aperture of the second drive arm.

8. The serviceable actuation arrangement of claim 7 wherein the connector clip has a two parallel arced bows connected together at one end by a pivot rod, wherein the pivot rod is rotatably connected to the bridge using a snap-fit tab formed on the bridge and the first pivot post extends from a first one of the two bows and the second pivot post extends from a second one of the two bows, such that the connector clip is rotatable about the first pivot post and second pivot post when the pivot rod is disconnected from the snap-fit tab of the bridge.

9. The serviceable actuation arrangement of claim 7 further comprising a clearance opening of the bridge that prevents the bridge from contacting the actuator when the linkage moves.

10. The serviceable actuation arrangement of claim 7 further comprising;
    a first half u-shaped flange on a first side of the first fixed arm and a second half u-shaped flange on a second side of the first fixed arm to assist in the forming of the aperture of the first fixed arm, thereby eliminating the need for extra tooling;
    a first half u-shaped flange on a first side of the second fixed arm and a second half u-shaped flange on a second side of the second fixed arm to assist in the forming of the aperture of the second fixed arm, thereby eliminating the need for extra tooling.

11. The serviceable actuation arrangement of claim 7 further comprising
    a plurality of vane pivot posts formed on the two vertical link arms;
    a plurality of vanes of an active grille shutter system, wherein each one of the plurality of vanes is connected to a respective one of the plurality of vane pivot posts.

12. The serviceable actuation arrangement of claim 7 further comprising a retainer finger extending from the first fixed arm and the second fixed arm for aligning and retaining the first pivot post and second pivot post through the respective aperture of the first fixed arm and aperture of the second fixed arm.

\* \* \* \* \*